Figure 1:
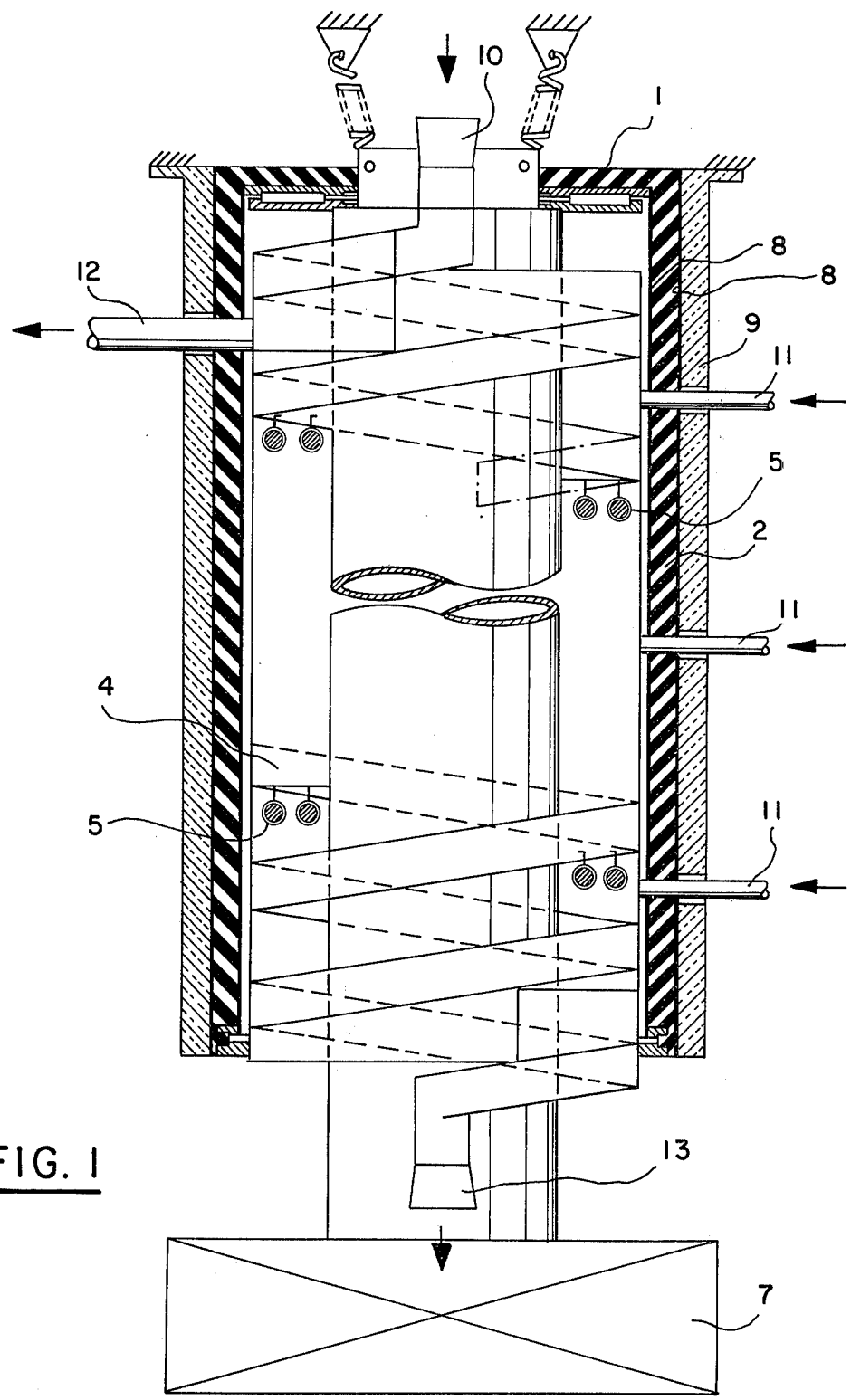

United States Patent [19]

Czerny et al.

[11] 4,035,151

[45] July 12, 1977

[54] POWDER-AND-GAS VIBRATING REACTOR

[75] Inventors: Thomas Czerny, Glashutten; Hans von Döhren, Frankfurt am Main; Lothar Lösch; August Winsel, both of Kelkheim, Taunus, all of Germany; Kurt Ziegler, deceased, late of Summern, Germany, by Rosemary Ziegler, heiress

[73] Assignee: Varta Batterie Aktiengesellschaft, Hannover, Germany

[21] Appl. No.: 544,753

[22] Filed: Jan. 28, 1975

[30] Foreign Application Priority Data

Jan. 29, 1974 Germany .......................... 2403998

[51] Int. Cl.² .................... B01F 3/06; B01F 11/00; B01J 8/08; B01J 8/16
[52] U.S. Cl. ............................. 23/252 R; 34/164; 198/756; 259/DIG. 24; 259/DIG. 41; 259/DIG. 42; 432/134
[58] Field of Search ......... 23/252 R, 288 E, 288 C; 34/201, 236, 164; 198/136, 220 BA, 220 BC; 259/75, 4 A, 4 AB, 4 AC, DIG. 24, DIG. 41, DIG. 42; 432/134

[56] References Cited

U.S. PATENT DOCUMENTS

| 693,455 | 2/1902 | Stanley | 34/164 |
|---|---|---|---|
| 2,498,405 | 2/1950 | Fader | 23/288 E |
| 2,667,452 | 1/1954 | Petit | 432/134 |
| 2,983,051 | 5/1961 | Zimmermann et al. | 34/164 |
| 3,239,197 | 3/1966 | Tollar | 259/4 AB |
| 3,545,609 | 12/1970 | Carrera et al. | 34/164 |
| 3,742,614 | 7/1973 | Bettermann et al. | 34/164 |
| 3,868,213 | 2/1975 | Shulika et al. | 34/164 |

Primary Examiner—Morris O. Wolk
Assistant Examiner—Bradley Garris
Attorney, Agent, or Firm—Weiser, Stapler & Spivak

[57] ABSTRACT

Powdery material flows downwardly along a vibratory spiral conveyor chute, while gas flows counter to the powder, preferably in excess. Mixing ramp arrangements are provided in the chute. These involve inclined ramp surfaces dividing the powder stream into two layers, and provisions for causing the initially uppermost layer to tumble down onto the chute bottom while the initially lowermost layer is still supported on its ramp. The latter then drops down, too, and now becomes the uppermost layer.

5 Claims, 3 Drawing Figures

POWDER-AND-GAS VIBRATING REACTOR

This invention relates to a method of and apparatus for bringing about reactions between a powder and a gas, in which the contact between the powder and reaction gas produces a chemical reaction. The term chemical reaction is generic, as used herein, to include reactions whether substitution, exchange, replacement, addition, or other.

To bring about reactions between powdery and gaseous substances there have been used in the art roasting ovens, rotary kilns or fluidized bed arrangements, and scrubbing columns.

In an oven, the powder to be treated is processed in batches, involving deposition of a relatively thick layer on a grate. The thick layers which are required to process sufficiently large quantities, together with poor diffusion which prevails, lead to non-uniform reactions. Moreover, these processes take a long time. The resultant products are non-uniform in structure and chemical properties.

Rotary kilns permit higher throughput, and continuous in-and output. However, the none-uniform distribution of the powder to be treated along the wall of the reaction vessel also prevents formation of a completely homogeneous product. The availability of contact between gas and powder is limited by the interior surface area and the speed of rotation of the reactor.

Treatment in fluidized beds is difficult in large scale applications, and especially so when a powder is involved which has small grain size, or which has a broad distribution of grain sizes. The residence time of the different grain size fractions differs, and this creates the risk that non-homogeneous products will result.

To react gases with solids, so-called vertical kilns or other columns such as scrubbers may be utilized. In these the powder is poured into a container through which the gas flows generally from bottom to top. Such arrangements can only be operated discontinuously in batch process, and the powder must have predetermined grain sizes to permit gas passage and also keep the diffusion path short. Furthermore, channels can easily form in the charge, through which the gas escapes.

Accordingly, it is a principal object of the invention to provide a continuous process for carrying on reactions between powdery and gaseous substances, by means of which homogeneous and highly active products are obtained in comparatively short time.

This object, and others which will appear, is achieved by introducing the powdery material from the top into a vibratory spiral conveyor, maintained at reaction temperature, and surrounded by a gas-tight housing. The continuous layer of such material covering the bottom of the conveyor chute is brought into contact with the reaction as traversing the spiral conveyor in counterflow direction. The gaseous reaction products, if any, are removed, together with the reaction gas stream, at the top of the spiral conveyor. The powdery reaction product is withdrawn at the bottom end of the vibratory spiral conveyor. Ideally, the process is carried out continuously, either by continuous feeding and/or continuous removing of product. If the reaction is exothermic no heating is required, indeed cooling may be appropriate; when the reaction requires heating, such is supplied.

The apparatus for practicing the method of the invention comprises a vibratory spiral conveyor within a gas-tight housing, a reaction gas inlet and outlet means for the spiral conveyor, a heater means placed below the conveyor chute, and mixing means placed within the conveyor path.

Such a method and apparatus are particularly useful for the production of active metallic powders and catalysts, such as oxidation-, reduction- or hydration-catalysts, as well as in the production on a large scale of active mass for galvanic elements. However, the method and apparatus have wide applicability wherever one or more particular powdery material is to be reacted with a gas.

Figure 2A:
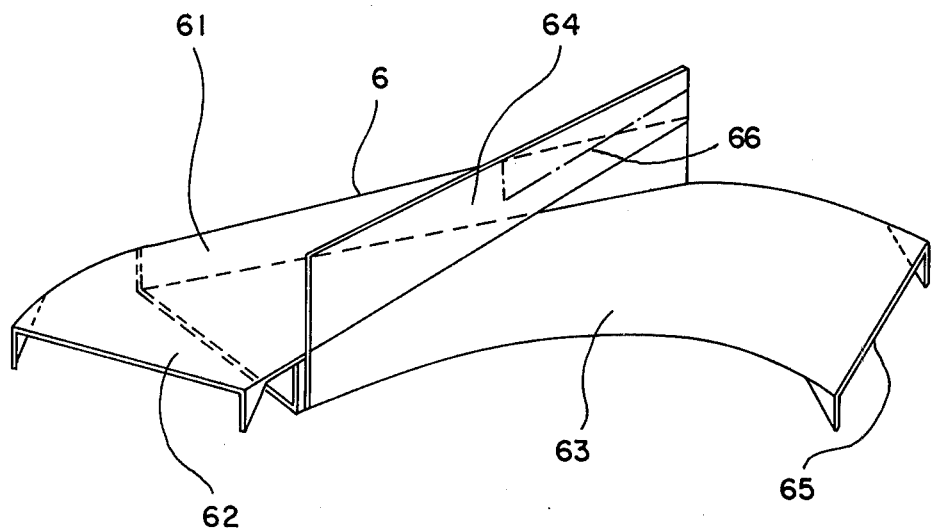
Figure 2B:
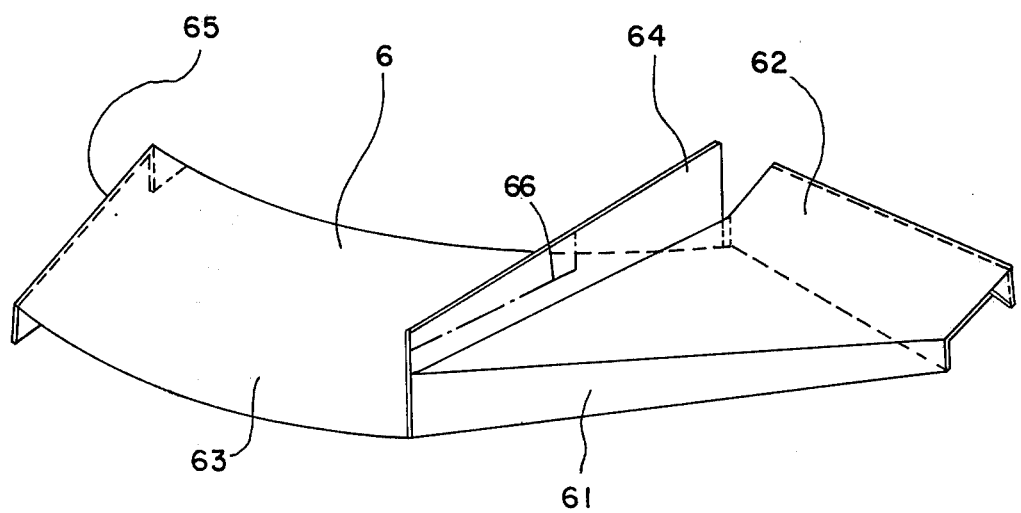

For further details reference is made to the discussion which follows, in the light of the accompanying drawings, wherein FIG. 1 shows, in diagrammatic form, an overall illustration of an embodiment of the invention; and FIGS. 2a and 2b show perspective views taken from opposite directions of a mixing arrangement for the powdery material processed in the embodiment of FIG. 1.

Referring to FIG. 1, this shows a spiral conveyor 1 provided with a gas-tight enclosure consisting of two double-walled half shells 8, whose interstices are filled with silicate beads for thermal insulation. This enclosure can further be surrounded with batting 9 of glass wool.

At the bottom a vibratory drive is provided which may utilize, for example, an oscillating magnet 7 or an eccentric motor drive (not shown).

Where air is used as the reaction gas, the vibratory spiral conveyor and its surrounding apparatus need not be purged of air by passage of nitrogen before being put into operation; but nitrogen is used where air is not the reaction gas. Subsequently, the nitrogen is evacuated by entrainment with the reaction gas. The appropriate reaction gas pressure is then established, and the reactor is brought to its reaction temperature. The powdery material is then introduced, via a dosing trough, continuously from above into the inlet duct 10 of the spiral conveyor. The powdery material flows along conveyor chute 4, which may be heated by a heating arrangement placed beneath it, e.g. by heating rods 5, or it may be cooled by appropriate cooling means. The powdery material is intermixed by means of several mixing means positioned along the conveyor chute. The comparatively thin layer of powdery material thus moving from top to bottom is brought into contact with an excess of reaction gas flowing along the spiral conveyor in counterflow direction. This gas is introduced through inlets 11 at differen heights along the vibratory spiral conveyor. At the lower end of the spiral conveyor, the powdery material is continuously withdrawn through an outlet duct 13. The gaseous reaction products are exhausted, along with the reaction gas stream, and are freed in conventional manner of the entrained fine powder dust.

It has proven particularly desirable to use, as mixing means, mixing ramp arrangements 6 positioned within conveyor chute 4. Once such mixing ramp arrangement 6 is shown in FIGS. 2a and 2b in perspective views taken from opposite sides. It includes two surface 62, 63, separated from each other by a vertical partition 61. The upper surface 62 starts from the middle of the cross-section of the powder layer within the duct. The lower surface 63 starts from the bottom of the conveyor chute. Both rise along partition 61, in the direction in which the powder being mixed moves along the conveyor chute. Upper surface 62 is provided with an up-turned lip 64 which bounds that surface in the direction of powder movement. A space is provided between partition 61 and the side wall of conveyor chute 4.

By means of this mixing ramp arrangement 6 the cross-section of the powdery layer is divided into two horizontally superposed halves. The half-layer which moves along the upper surface 62 drops off that surface and becomes deposited beneath the slightly rising lower surface 63, whereas the half-layer guided onto lower surface 63 drops over edge 65 onto the powder half-layer which emerges from beneath that edge.

If desired, there may also be cut out of up-turned lip 64 the portion indicated by dot-dash line 66 in FIGS. 2a and 2b. This permits powder moving up surface 62 to be discharged onto surface 63 in case the space between the sidewall of chute 4 and partition 61 becomes clogged, thereby inhibiting the normal flow of material.

Among the examples which follow, Examples 2 to 4 further describe the production of several catalysts, as well as of active mass for galvanic elements utilizing the method of the invention.

These examples are not to be construed as limitative, but are by way of illustration only.

By use of that method, other chemical reactions like substitutions may be carried out on a continuous basis. Such reactions are further described in Examples 5 and 6.

EXAMPLE 1

PRODUCTION OF A COPPER CHROMITE CATALYST FOR SELECTIVE HYDRATION, UTILIZING AIR AS OXIDIZING GAS

In an ammonia solution, a di-chromate is obtained as a fine powder by precipitation with sodium chromate from copper nitrate. The composition has the formula $[Cu(NH_3)_2](NH_4)_2 \cdot (CrO_4)_2$. This powder is thoroughly washed and substantially freed of water by drying. Subsequently, the powder is continuously decomposed in the spiral conveyor reactor by counterflow of a preheated air current, at 300° to 350° C and with a layer thickness of 10 to 20 mm. This involves the following reaction:

$$[Cu(NH_3)_2] \cdot (NH_4)_2 \cdot (CrO_4)_2 \xrightarrow[300 - 350°C]{Air} CuO \cdot Cr_2O_3 + N_2 + NH_3 + H_2O$$

The gaseous reaction products are removed through condensation ($H_2O$) and scrubbing with water ($NH_3$). The nitrogen is purged out with the air stream. The grain size may be varied within wide limits depending upon the grain size of the di-chromate. The catalyst produced in this manner is particularly suitable for selective reduction of carbonyl groups: aldehydes and ketones are reduced to alcohols, esters, and carboxylic acids. Likewise amides are reduced to amines.

EXAMPLE 2

PRODUCTION OF A NICKEL CARRIER CATALYST FOR LARGE SCALE FAT RENDERING

The mass of a nickel carrier catalyst consists of basic nickel carbonate precipitated onto silicate beads. It is introduced continuously into the spiral conveyor reactor, at a reaction temperature between 350° and 500° C and a layer depth between 1 and 10 mm. Hydrogen gas is introduced in counterflow manner in excess (about 10 times stochiometric). The hydrogen is heated to the reaction temperature before introduction into the reactor. At a residence time between 5 and 20 minutes, the basic carbonate is then completely reduced to very finely divided nickel. This endothermic reaction takes place in accordance with the followng equations:

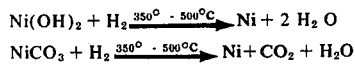

These reactions are promoted by utilizing short diffusion paths for the gaseous reactants and by rapid removal of reaction water and carbon dioxide. Furthermore, the continuous occurrence of the reduction in a thin layer makes possible very uniform heat supply, which in turn assures a uniform product.

The gaseous reaction products ($CO_2$, $H_2O$ vapor) entrained in the hydrogen stream are removed without difficulty by absorption or condensation in a scrubbing column.

The catalysts produced with the foregoing process exhibit 10 to 20% higher hydrogenation acitivity than those produced by conventional processes.

EXAMPLES 3

PRODUCTION OF AN ELECTROCHEMICALLY ACTIVE Ni (OH)₂-POWDER (POSITIVE MASS FOR ALKALINE STORAGE BATTERIES)

Finely divided nickel (II) — oxalate ($Ni_2O)_4$ (grain size greater than 50 $\mu$) is transported from top to bottom in the sprial conveyor reactor at 150° to 250° C and in a layer thicknes of 10 to 15 mm. Air sautrated with water at about 2 atmospheres above atmospheric pressure, preheated to about 300° C, is supplied to the powder transport in counterflow manner. There takes place a decomposition (hydrothermic decomposition) of the nickel oxalate with formation of finely divided nickel hydroxide $Ni(OH)_2$ according to the following reaction:

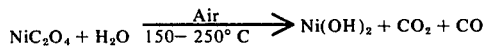

The gaseous reaction products $CO_2$ and $CO$ which are exhausted with air as the carrier gas are, after transformation of the CO through catalytic oxidation, discharged to the outside as $CO_2$.

The resulting nickel hydroxide powder of grain size ranging from 2 to 5 $\mu$ has been proven particularly effective for use as the positive active mass in alkaline storage batteries. It is emphasized that, because of the uniformly fine grain distribution of the precipitating hydroxide, the time consuming practices for storage batteries which have been customary, have been able to be reduced from about 60 hours to about 20 to 25 hours. Finally, the current outputs, especially at high current flow, can be considerably increased because of the greater surface area and the improved surface availability of the powder to the electrochemical processes taking place in the electrodes.

EXAMPLE 4

PRODUCTION OF NEGATIVE, PREHEATED CADMIUM MASSES WITH METALLIC NICKEL CONDUCTIVE MATRIX FOR ALKALINE STORAGE BATTERIES

A finely divided powder (grain size less than 10μ)consisting of mixed crystals of 10% nickel formiate and 90% cadmium formiate is displaced continuously in the spiral conveyor reactor from top to bottom at a temperature of 270° to 290° C and a layer thickness of 15 to 25 mm. Hydrogen preheated to the reaction temperature, is flowed counter-currently to the powder stream. The reactions which take place at this temperature within the reactor are shown by the following reactions:

$$Cd(HCO_2)_2 + H_2 \xrightarrow{270° - 290°C} Cd + 2 H_2^o + CO$$

$$Ni(HCO_2)_2 + H_2 \xrightarrow{270° - 290°C} Ni + 2 H_2^o + CO$$

EXAMPLE 5

A further example of a treatment of gases with powdery solids is scrubbing of $CO_2$ wih molecular sieves. Molecular sieves are substances with high absorption capability for gases and vapors. For $CO_2$ this absorptivity is sometimes greater than 15% by weight at room temperature. At high temperatures, i.e. 150° C, the greater proportion of the $CO_2$ is rereleased.

These facts may be used for the removal of $CO_2$ from reforming exhaust gases. Such gas contains about 25% $CO_2$ and about 75% $H_2$. The gas is introduced from the bottom into a spiral conveyor in an amount of 55 nm³/h. In the conveyor cute, which has a total surface area of 1 m² and a length of 13 m, it flows counter to a granular layer of the molecular sieve material. Approximately 180 l/h of the moleculr sieve material, corresponding to 275 kg/h, passes through the reactor. At a layer thickness of 2 cm this corresponds to a residence time of six minutes within the spiral conveyor. The gas leaving the spiral conveyor at the top then contains only fractions of a percent of $CO_2$, whereas the charged molecular sieve material removed from the bottom of the spiral conveyor contains more than 10% by weight of $CO_2$. The reaction temperature is 25° C. The heat produced during the reaction is removed by means of cooling pipes attached to the bottom of the conveyor bed.

It has proven useful to also regenerate the molecular sieve in a spiral conveyor. To this end, the granular material is introduced at the top while the conveyor bed is heated to 150° to 250° C. Air streams into the conveyor path from the bottom, and becomes charged with carbon dioxide on the way toward the top. This process is particularly effective because it is a counterflow process, and the ultimate charge of the molecular sieve material is kept low due to the low $CO_2$ concentration in the air at the exit of the powder from the spiral conveyor.

The two spiral conveyor reactors for the absorption and desorption of the $CO_2$ may be united in a single installation with a closed, molecular sieve circulatory system. Preferably it also includes provision for buffer storage of a predetermined excess quantity of the granular molecular sieve material.

The process described in this example may also be used, at suitably adjusted operating temperatures, for the removal of other impurities i.e., undesirable gas contaminants from gas mixtures, e.g., $H_2^S$, $NH_3$, benzene and methanol, to mention just a few. For such cases, activated carbon powder or granular material may be used to good advantage as the molecular sieves.

EXAMPLE 6

Nickel carrier catalyst of the type described in Example 2, contain among other impurities, nickel after they have been used for fat rendering. Because of environmental pollution problems, this nickel content has been creating increasing diffiulties in the disposal of such wastes. Therefore a process for recovering the nickel from the catalyst wastes is much sought after.

It has been found that it is possible to free the spent catalyst of nickel, after removal of the main fat quantities, by passng the material through a spiral conveyor reactor a few degrees below 100° C, in counterflow to a CO gas stream. In the course of the reaction, carbonyl nickel is produced as an intermediates (unstable) compound, removed from the reactor by the circulting CO, and decomposed into nickel powder and CO at 180° C. In this way, the nickel is recovered as a valuable material of high purity, and the carrier mass which leaves the spiral conveyor at the bottom can be reused.

An additional class of processes in which use of the spiral conveyor or reactor is well suited, are catalytic gas treatment processes, in which regeneration of the catalyst is required after a predetermined reaction period. An example is the catalytic treatment of natural gas or petroleum derivatives which in many cases lead to poisoning of the catalyst by sulfur content. Continuous passage of the catalyst through the reactor permits its regeneration outside the reactor, with most economical utilization inside the reactor installation. This minimizes the consumption of these usually expensive catalysts and thereby reduces the required investment of capital.

Other examples of the application of exchange processes in the spiral conveyor reactor of the inventon are readily available to one skilled in the art. For instance, the drying of crystals and powders, in which the movement in the spiral conveyor counteracts the tendency of the crystals to agglomerate. The roasting of sulfide materials is an example of the treatment of powdery solids with gases, in which the modification of the solid is the object of the process.

From these examples it is evident to one skilled in the art that the invention is particularly suitable for producing active metal powders with highly desirable characteristics. Because of the wide applicability of the process and apparatus, it is apparent that it is not the nature of the particular chemicals used but, the process of operating the device of the invention and the device itself, which are the more important aspects of the invention.

Due to the fact that the powder grains are moved along by vibration, agglomeration is prevented. By increasing the amplitude of the vibration, even powder which does not flow easily can be treated. Because the gas is supplied in excess, the equilibrium of the chemical reaction is displaced in favor of the end product and this reduces the residence time of the powder in the vibratory spiral conveyor. The impediments to diffusion which characterize previous known techniques, are considerably reduced by the mixing which is carried out in accordance with the invention by means of the mixing ramp arrangements and by passing the reaction gas in counterflow manner. Thus the heretofore customary residence time of a few hours can typically be reduced to a few minutes.

Because, in accordance with the invention, heat is supplied both from below by a heater arrangement positioned below the chute of the spiral conveyor, and from above (through radiation) and through convection by means of the reaction gas, very uniform heating of the powdery material is achieved. This also contributes appreciably to the uniformity of the end product achievable by means of the invention.

We claim:

1. Apparatus for chemically reacting a powdery material and a gas comprising:

a vibratory spiral conveyor which includes a spiral chute having its axis positioned generally vertically, a chamber enclosing the chute, and means for producing axial vibration of the chute;

means for introducing said powdery material at the top of said conveyor at a predetermined rate to form a substantially continuous descending layer on the chute end means for withdrawing said powdery material at the bottom;

means for introducing gas into the chamber below said conveyor top and means for withdrawing said gas at or near the conveyor top together with the gaseous reaction products, therby to produce a countercurrent flow of powdery material and gas in the chamber along the chute, the gas introducing means being constructed to introduce the gas at a rate to maintain in the countercurrent flow a quantity of gas in excess of that required to react with the powdery material; temperature control means positioned below the chute of the spiral conveyor; and mixing means disposed along the spiral chute, said mixing means comprising a pair of vertically and longitudinally displaced surfaces and a vertical partition extending between and along one edge of the surfaces, the upper surface having its upstream edge postitioned transversely along the middle of the cross-section of the powdery material layer flowing down said chute and the lower surface having its upstream edge positioned adjacent the floor of said chute, both surfaces rising relative to the chute in a downstream direction, the upper surface having an upturned lip bounding the downstream edge of the upper surface generally transversely to the direction of powdery material flow, and a space being provided between said vertical partition and the sidewall of the chute, whereby an upper layer of said powdery material flows along said upper surface, is discharged into said space, and flows therefrom beneath the downstream edge of said lower surface, and a lower layer of said powdery material flows along said lower surface and is discharged from the downstream edge thereof onto the top od the discharged upper layer.

2. Apparatus for chemically reacting a powder and a gas comprising:

a vibratory spiral conveyor including a spiral chute means for introducing said powdery material at the top of said conveyor and means for withdrawing it at the bottom;

means for introducing said gas below said conveyor top and means for withdrawing it at or near the conveyor top together with the gaseous reaction products; temperature control means positioned below the chute of the spiral conveyor; and mixing means disposed along the spiral chute, said mixing means comprising a pair of vertically and longitudinally displaced surfaces and a vertical partition extending between and along one edge of the surfaces, the upper surface having its upstream edge positioned transversely along the middle of the cross-section of the powdery material layer flowing down said chute and the lower surface having its upstream edge positioned adjacent the floor of said chute, both surfaces rising relative to the chute in a downstream direction, the upper surface having an upturned lip bounding the downstream edge of the upper surface generally transversely to the direction of powder material flow, and a space being provided between said vertical partition and the sidewall of the chute, whereby an upper layer of said powdery material flows along said upper surface, is discharged into said space, and flows therefrom beneath the downstream edge of said lower surface, and a lower layer of said powdery material flows along said lower surface and is discharged from the downstream edge thereof onto the top of the discharged upper layer.

3. The apparatus of claim 2, wherein said upturned lip has a lower portion over which powdery material flowing along said upper surface can spill onto said lower surface.

4. The apparatus of claim 1 wherein the gas introducing means includes a plurality of inlets into the chamber, spaced vertically along the spiral axis.

5. The apparatus of claim 4, wherein the gas withdrawing means comprises a single outlet from the chamber spaced vertically above all the inlets.

* * * * *